(12) United States Patent
Liu et al.

(10) Patent No.: US 11,995,790 B1
(45) Date of Patent: May 28, 2024

(54) THREE-DIMENSIONAL VIEW-BASED FABRICATED BUILDING DISPLAY METHOD AND SYSTEM

(71) Applicant: China Construction Industrial & Energy Engineering Group Huanghe Construction Co., Ltd., Jinan (CN)

(72) Inventors: Jie Liu, Jinan (CN); Zhanqi Zhang, Jinan (CN); Chunyuan Tang, Jinan (CN); Fei Huang, Jinan (CN); Song Chen, Jinan (CN); Daoming Li, Jinan (CN); Liushuai Dong, Jinan (CN)

(73) Assignee: China Construction Industrial & Energy Engineering Group Huanghe Construction Co., Ltd., Jinan (CN)

( * ) Notice: Subject to any disclaimer, the term of this patent is extended or adjusted under 35 U.S.C. 154(b) by 0 days.

(21) Appl. No.: 18/398,074

(22) Filed: Dec. 27, 2023

(30) Foreign Application Priority Data

May 9, 2023 (CN) .......................... 202310514504.4

(51) Int. Cl.
| | | |
|---|---|---|
| *G06T 19/20* | (2011.01) | |
| *G06T 15/06* | (2011.01) | |
| *G06T 15/10* | (2011.01) | |

(52) U.S. Cl.
CPC .............. *G06T 19/20* (2013.01); *G06T 15/06* (2013.01); *G06T 15/10* (2013.01); *G06T 2210/04* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 10,275,544 B1* | 4/2019 | Giattina ................. | G06F 30/13 |
| 2010/0315423 A1 | 12/2010 | Ahn et al. | |
| 2020/0096957 A1* | 3/2020 | Sridharan ............. | G05B 13/04 |
| 2022/0382925 A1* | 12/2022 | Lassner ................. | G06F 30/13 |
| 2023/0203800 A1* | 6/2023 | Lim ........ | E04B 1/41 |
| | | | 52/91.1 |
| 2023/0274045 A1* | 8/2023 | Yang ...................... | G06F 30/13 |
| | | | 703/1 |

FOREIGN PATENT DOCUMENTS

| | | |
|---|---|---|
| CN | 103366391 A | 10/2013 |
| CN | 113744380 A | 12/2021 |

* cited by examiner

*Primary Examiner* — Nurun Flora
(74) *Attorney, Agent, or Firm* — Nitin Kaushik

(57) ABSTRACT

The present invention provides a three-dimensional view-based fabricated building display method and system. In particular, a three-dimensional model is loaded, the three-dimensional model is rendered by a first rendering mode to obtain an average frame rate of automatic rotation. In a case that the average frame rate is less than a first threshold, the three-dimensional model is divided into two layers. the first layer is a model primitive layer, and the second layer is a reference primitive and view proprietary primitive layer. The first layer is rendered by the first rendering mode, and the second layer is rendered by a second rendering mode. In a case that the average frame rate is greater than a second threshold, the three-dimensional model is rendered by a third rendering mode.

6 Claims, 4 Drawing Sheets

THREE-DIMENSIONAL VIEW-BASED FABRICATED BUILDING DISPLAY METHOD AND SYSTEM

CROSS-REFERENCE TO RELATED APPLICATIONS

The application claims priority to Chinese patent application No. 202310514504.4, filed on May 9, 2023, the entire contents of which are incorporated herein by reference.

TECHNICAL FIELD

The present invention relates to the field of fabricated buildings, and in particular to a three-dimensional view-based fabricated building display method and system.

BACKGROUND

Fabricated buildings refer to the way of mounting prefabricated members on a construction site to construct buildings. According to different prefabricated members used, the fabricated buildings are roughly divided into three types, namely, a concrete fabricated building, a steel structure fabricated building and a hybrid fabricated building. In the production process of the prefabricated members, the humidity and the temperature can be controlled well, and the prefabricated members have higher stability and reliability compared with in-situ casting. Furthermore, the prefabricated members are mounted directly on the construction site, so that the building efficiency can be greatly improved, the cost can be controlled better, and the labor cost can be saved in the building process.

The development of the fabricated buildings is inseparable from an informationization means. In particular, simulation is performed by a computer to complete the design of all fabricated buildings and prefabricated members in the early stage. Informatization covers the whole process of the fabricated buildings from design, construction to operation, thereby realizing the whole process cooperation of a designer, a prefabricated member producer, a builder and a user. Each component of the fabricated building and a relationship between the components are displayed in a three-dimensional view. Displaying in construction simulation and collision inspection in a three-dimensional view mode is helpful for personnel of all parties to rapidly check and understand the situation of the fabricated building. How to rapidly load a fabricated building model and display the fabricated building as realistically as possible under the condition of limited calculation resources is an urgent problem in this field.

SUMMARY

To solve the above problem, according to a first aspect, the present invention provides a three-dimensional view-based fabricated building display method. The method includes the following steps:

S1: loading a three-dimensional model of a fabricated building, rendering the three-dimensional model by a first rendering mode after loading the three-dimensional model, and automatically rotating the three-dimensional model for N turns to obtain an average frame rate FPS1 of the automatic rotation, where N is a positive integer, S2: in a case that the average frame rate FPS1 is less than a first threshold, performing S3; in a case that the average frame rate FPS1 is greater than a second threshold, performing S4; and in a case that the average frame rate FPS1 is not less than the first threshold and not greater than the second threshold, rendering the three-dimensional model by the first rendering mode, where the first threshold is less than the second threshold;

S3: dividing the three-dimensional model into two layers, rendering the first layer by the first rendering mode, and rendering the second layer by a second rendering mode, wherein the first layer is a model primitive layer, and the second layer is a reference primitive and view proprietary primitive layer; and S4: rendering the three-dimensional model by a third rendering mode.

Preferably, the rendering the three-dimensional model by a third rendering mode is specifically as follows:

obtaining the average frame rate FPS1, calculating a ratio of the average frame rate FPS1 to the second threshold, determining the maximum reflection and refraction times based on the ratio and the number of model primitives, and taking the maximum reflection and refraction times as a termination condition of ray traced iteration; and rendering the three-dimensional model based on the maximum reflection and refraction times and by a ray traced rendering mode.

Preferably, the determining the maximum reflection and refraction times based on the ratio and the number of model primitives is specifically as follows:

performing calculation according to a formula $$N = \begin{cases} 1, \Gamma \le 0 \\ \lceil \Gamma \rceil, \Gamma > 0 \end{cases}$$

to obtain the maximum reflection and refraction times N, where $\Gamma$ is a parameter, the calculation mode of $\Gamma$ is $$\Gamma = \gamma + 1 - 3\tanh\left(\frac{M}{a}\right),$$

$\gamma$ represents the ratio, M represents the number of the model primitives, $\alpha$ represents a preset value, tanh( ) is a hyperbolic tangent function, and $\lceil\ \rceil$ represents rounding up to an integer.

Preferably, the rendering the three-dimensional model based on the maximum reflection and refraction times and by a ray traced rendering mode is specifically as follows:

rendering all the primitives in the three-dimensional model based on the maximum reflection and refraction times and by the ray traced rendering mode, and automatically rotating the three-dimensional model for N turns to obtain an average frame rate FPS2 of the automatic rotation;

in a case that the average frame rate FPS2 is not less than the second threshold, rendering all the primitives in the three-dimensional model based on the maximum reflection and refraction times and by the ray traced rendering mode; otherwise, rendering model primitives and reference primitives in the three-dimensional model based on the maximum reflection and refraction times and by the ray traced rendering mode, rendering view proprietary primitives by the first rendering mode, and automatically rotating the three-dimensional model for N turns to obtain an average frame rate FPS3 of the automatic rotation;

in a case that the average frame rate FPS3 is not less than the second threshold, rendering the model primitive and the reference primitive in the three-dimensional model based on the maximum reflection and refraction times and by the ray traced rendering mode, and rendering the view proprietary primitive by the first rendering mode; otherwise, rendering the model primitive in three-dimensional model based on the maximum reflection and refraction times and by the ray traced rendering mode, rendering the reference primitive and the view proprietary primitive by the first rendering mode, and automatically rotating the three-dimensional model for N turns to obtain an average frame rate FPS4 of the automatic rotation; and in a case that the average frame rate FPS4 is not less than the second threshold, rendering the model primitives in the three-dimensional model based on the maximum reflection and refraction times and by the ray traced rendering mode; otherwise, rendering the reference primitives and the view proprietary primitives by the first rendering mode; otherwise, rendering the three-dimensional model by the first rendering mode.

Preferably, the time complexity and/or the space complexity of the first rendering mode are/is greater than the time complexity and/or the space complexity of the second rendering mode, and the time complexity and/or the space complexity of the first rendering mode and the time complexity and/or the space complexity of the second rendering mode are less than the time complexity of the ray traced rendering mode.

According to another aspect, the present invention provides a three-dimensional view-based fabricated building display system. The system includes the following modules:

a pre-rendering module, configured to: load a three-dimensional model of a fabricated building, render the three-dimensional model by a first rendering mode after loading the three-dimensional model, and automatically rotate the three-dimensional model for N turns to obtain an average frame rate FPS1 of the automatic rotation, where N is a positive integer;

a rendering mode adjusting module, configured to: in a case that the average frame rate FPS1 is less than a first threshold, perform a first rendering module; in a case that the average frame rate FPS1 is greater than a second threshold, perform a second rendering module; and in a case that the average frame rate FPS1 is not less than the first threshold and not greater than the second threshold, rendering the three-dimensional model by the first rendering mode, where the first threshold is less than the second threshold;

the first rendering module, configured to: divide the three-dimensional model into two layers, render the first layer by the first rendering mode, and render the second layer by a second rendering mode, where the first layer is a model primitive layer, and the second layer is a reference primitive and view proprietary primitive layer; and the second rendering module, configured to: render the three-dimensional model used by a third rendering mode.

Preferably, the render the three-dimensional model by a third rendering mode is specifically as follows:

obtain the average frame rate FPS1, calculate a ratio of the average frame rate FPS1 to the second threshold, determine the maximum reflection and refraction times based on the ratio and the number of model primitives, and take the maximum reflection and refraction times as a termination condition of ray traced iteration; and render the three-dimensional model based on the maximum reflection and refraction times and by a ray traced rendering mode.

Preferably, the determine the maximum reflection and refraction times based on the ratio and the number of model primitives is specifically as follows:

perform calculation according to a formula $$N = \begin{cases} 1, \Gamma \leq 0 \\ \lceil \Gamma \rceil, \Gamma > 0 \end{cases}$$

to obtain the maximum reflection and refraction times N, where $\Gamma$ is a parameter, the calculation mode of $\Gamma$ is $$\Gamma = \gamma + 1 - 3\tanh\left(\frac{M}{a}\right),$$

$\gamma$ represents the ratio, M represents the number of the model primitives, $\alpha$ represents a preset value, tanh( ) is a hyperbolic tangent function, and $\lceil \ \rceil$ represents rounding up to an integer.

Preferably, the render the three-dimensional model based on the maximum reflection and refraction times and by a ray traced rendering mode is specifically as follows:

render all the primitives in the three-dimensional model based on the maximum reflection and refraction times and by the ray traced rendering mode, and automatically rotate the three-dimensional model for N turns to obtain an average frame rate FPS2 of the automatic rotation;

in a case that the average frame rate FPS2 is not less than the second threshold, render all the primitives in the three-dimensional model based on the maximum reflection and refraction times and by the ray traced rendering mode; otherwise, render model primitives and reference primitives in the three-dimensional model based on the maximum reflection and refraction times and by the ray traced rendering mode, render view proprietary primitives by the first rendering mode, and automatically rotate the three-dimensional model for N turns to obtain an average frame rate FPS3 of the automatic rotation;

in a case that the average frame rate FPS3 is not less than the second threshold, render the model primitive and the reference primitive in the three-dimensional model based on the maximum reflection and refraction times and by the ray traced rendering mode, and render the view proprietary primitive by the first rendering mode; otherwise, render the model primitive in three-dimensional model based on the maximum reflection and refraction times and by the ray traced rendering mode, render the reference primitive and the view proprietary primitive by the first rendering mode, and automatically rotate the three-dimensional model for N turns to obtain an average frame rate FPS4 of the automatic rotation; and in a case that the average frame rate FPS4 is not less than the second threshold, render the model primitives in the three-dimensional model based on the maximum reflection and refraction times and by the ray traced rendering mode; otherwise, render the reference primitives and the view proprietary primitives by the first rendering mode; otherwise, render the three-dimensional model by the first rendering mode.

Preferably, the time complexity and/or the space complexity of the first rendering mode are/is greater than the time complexity and/or the space complexity of the second rendering mode, and the time complexity and/or the space complexity of the first rendering mode and the time complexity and/or the space complexity of the second rendering mode are less than the time complexity of the ray traced rendering mode.

Finally, the present invention provides a computer-readable storage medium. The computer-readable storage medium stores a computer program. When the computer program is run by a processor, the above method is implemented.

Compared with the prior art, the present invention has the following advantages that after the three-dimensional model of the fabricated building is loaded, the three-dimensional model is rendered by the first rendering mode, the three-dimensional model is automatically rotated for N turns to obtain the average frame rate of the automatic rotation, and the rendering mode of the three-dimensional model is adjusted according to the average frame rate. According to the present invention, the rendering mode of the three-dimensional model of the fabricated building can be automatically adjusted to balance the rendering speed and the rendering effect.

BRIEF DESCRIPTION OF DRAWINGS

To describe the technical solutions in the specific embodiments of the present invention or in the prior art more clearly, the following briefly describes the accompanying drawings needed for describing the specific embodiments or the prior art. Apparently, the accompanying drawings in the following description show some embodiments of the present invention, and those of ordinary skill in the art may further derive other accompanying drawings from these accompanying drawings without creative labor.

DETAILED DESCRIPTION OF THE EMBODIMENTS

In this specification, relational terms such as first and second are only used to differentiate one entity or operation from another entity or operation, and do not necessarily require or imply that any actual relation or sequence exists between these entities or operations. Besides, the terms "comprise". "include" or any other variants thereof are intended to cover non-exclusive inclusion, so that a process, method, article or device including a series of elements not only includes those elements, but also includes other elements not explicitly listed, or also includes elements inherent to such process, method, article or device. Without more restrictions, the elements defined by the sentence "including a . . . " do not exclude the existence of other identical elements in the process, method, article, or device including the elements.

The following clearly and completely describes the technical solutions in the embodiments of the present invention with reference to the accompanying drawings in the embodiments of the present invention. Apparently, the described embodiments are merely a part rather than all of the embodiments of the present invention. Based on the embodiments in the present invention, all other embodiments obtained by those of ordinary skill in the art without making creative labor fall within the scope of protection of the present invention.

Specific Embodiment 1

Figure 1:
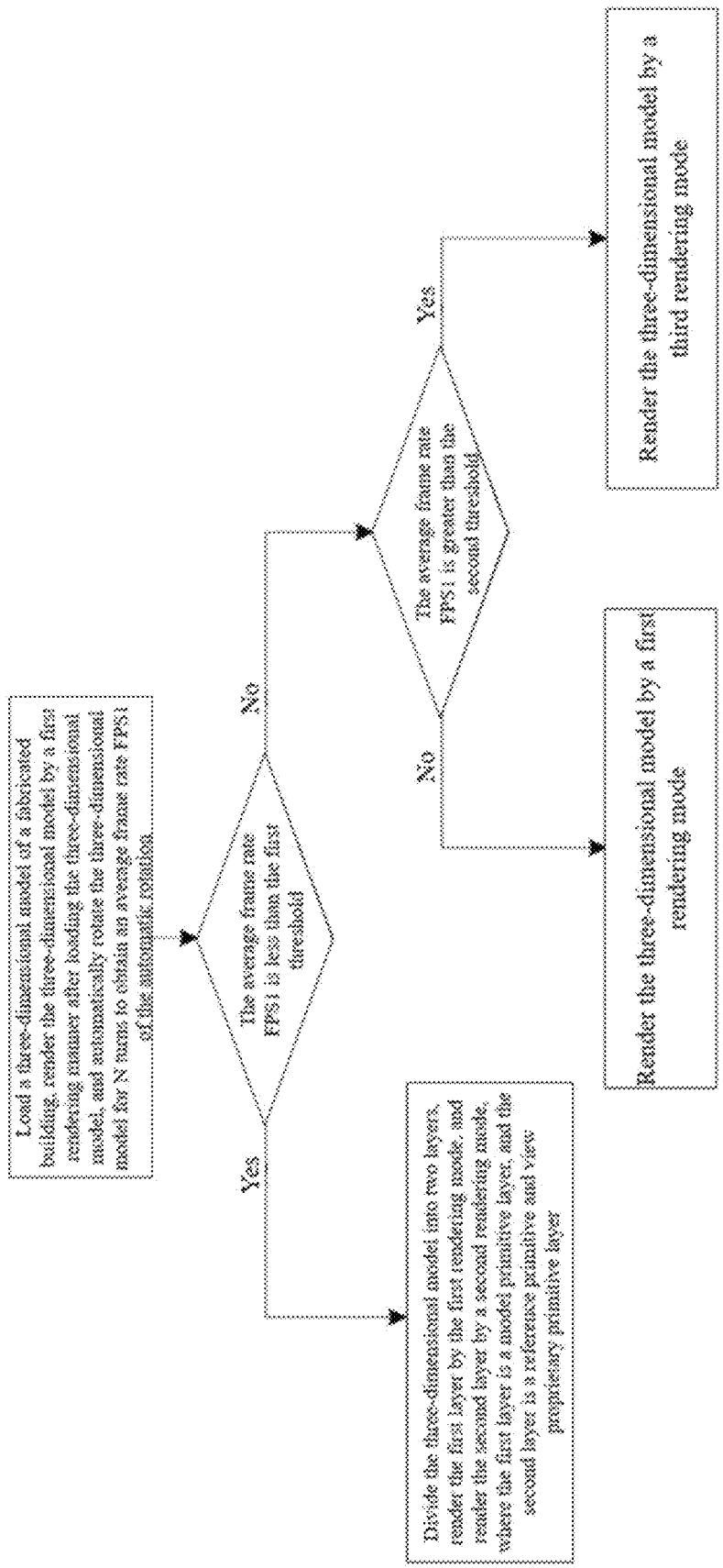
FIG. 1 is a flowchart according to Specific Embodiment 1.

According to a first aspect, the present invention provides a three-dimensional view-based fabricated building display method. As shown in FIG. 1, the method includes the following steps:

S1: loading a three-dimensional model of a fabricated building, rendering the three-dimensional model by a first rendering mode after loading the three-dimensional model, and automatically rotating the three-dimensional model for N turns to obtain an average frame rate FPS1 of the automatic rotation, where N is a positive integer.

The fabricating building is becoming a trend. Before the fabrication of the fabricated building, it is necessary to construct a three-dimensional model of the fabricated building. The three-dimensional model is not only beneficial for all aspects of the building to understand the final result of the fabricated building, but also beneficial to the planning and production of each component, and collision detection can be performed in advance. In the fabrication process, it is also necessary to adjust the fabricated building according to the actual production size of each component. Specifically, the constructed three-dimensional point cloud can be collected, and a three-dimensional view of the component can be constructed according to the point cloud, so that the fabrication process can be simulated continuously.

A good rendering effect can simulate the real fabricated building, and has a better experience on the lighting effect and the correlativity of the components. Due to different performance of the computer, when each party of the fabricated building checks the three-dimensional model of the fabricated building, some parties can check smoothly, and some parties achieve a poor effect. The so-called poor effect refers to, for example, stuck.

In view of the above problem, the present invention provides a three-dimensional view-based fabricated building display method. Firstly, the three-dimensional model of the fabricated building is located. The three-dimensional model of the fabricated building may be a three-dimensional model drawn by software, or may be a three-dimensional model constructed according to point cloud of the component in the assembling process. After the three-dimensional model of the fabricated building is loaded, to understand the performance of the current computer, the three-dimensional model is rendered by the first rendering mode, and the operation on the three-dimensional model is simulated, for example, the three-dimensional model is rotated for N turns to obtain the average frame rate FPS1 of the automatic rotation. In a case that the FPS1 is relatively large, the performance of the computer is proved to be good, and the three-dimensional model can be rendered by a rendering mode with a more realistic rendering effect. In a case that the FPS1 is relatively small, it is necessary to render the three-dimensional model by a simple rendering model.

S2: in a case that the average frame rate FPS1 is less than a first threshold, performing S3; in a case that the average frame rate FPS1 is greater than a second threshold, performing S4; and in a case that the average frame rate FPS1 is not less than the first threshold and not greater than the second threshold, rendering the three-dimensional model by the first rendering mode, where the first threshold is less than the second threshold;

S3: dividing the three-dimensional model into two layers, rendering the first layer by the first rendering mode, and rendering the second layer by a second rendering mode, where the first layer is a model primitive layer, and the second layer is a reference primitive and view proprietary primitive layer.

When the first layer is rendered, the corresponding primitive in the second layer of primitives may be set as background color or hidden. Similarly, when the second layer is rendered, the corresponding primitive in the first layer of primitives may be set as background color or hidden. After the first layer and the second layer are rendered, the first layer and the second layer are superimposed into a frame buffer. Or ray casting is used for determining whether a primitive is present or not. In a case that the primitive is present, the rendering effect of the corresponding layer is put into the corresponding frame buffer, and the positions without the primitives are put into the frame buffer according to the background color. The specific fusion mode of the rendered first layer and second layer is not specifically limited in the present invention.

S4: rendering the three-dimensional model by a third rendering mode.

In a case that the average frame rate FPS1 is less than the first threshold, it is indicated that the performance of the current computer is not high, and a complicated rendering mode cannot be supported. In the present invention, in a case that the FPS1 is less than the first threshold, the primitives of the fabricated building are classified. Specifically, according to the classification mode in Revit, the primitives of the three-dimensional model of the fabricated building are divided into: a model primitive, a reference primitive and a view proprietary primitive, where the model primitive further includes, for example, a main body of a wall and a ceiling, and a model component such as a stair, furniture and a pipeline; the reference primitive mainly includes an axis net and a reference plane; and the view proprietary primitive is mainly information related to an annotation primitive and a detail drawing. The model primitive plays a main role in the three-dimensional model of the fabricated building, that is, people mainly checking the model primitive when checking the fabricated building, and the rendering effect of the model primitive is important relative to the reference primitives and the view proprietary primitives.

After the primitives in the fabricated three-dimensional model are classified, the model primitives are taken as the first layer, the reference primitives and the view proprietary primitives are taken as the second layer, and the layers here may be represented by sets, that is, the model primitives are classified into a first set, and the reference primitives and the view proprietary primitives are classified into a second set.

The first layer still adopts the first rendering mode, the second layer adopts the second rendering mode with lower complexity, and the complexity here refers to a time complexity and/or a space complexity.

In a case that the average frame rate FPS1 is greater than the second threshold, it is indicated that the performance of the current computer is relatively high, for example, the current computer is configured with a high-performance graphics card, and the rendering speed is high. At this time, the three-dimensional model can be rendered by a rendering mode with a more complicated and better rendering effect. The rendering the three-dimensional model by a third rendering mode is specifically as follows:

obtaining the average frame rate FPS1, calculating a ratio of the average frame rate FPS1 to the second threshold, determining the maximum reflection and refraction times based on the ratio and the number of model primitives, and taking the maximum reflection and refraction times as a termination condition of ray traced iteration; and rendering the three-dimensional model based on the maximum reflection and refraction times and by a ray traced rendering mode.

Figure 2:
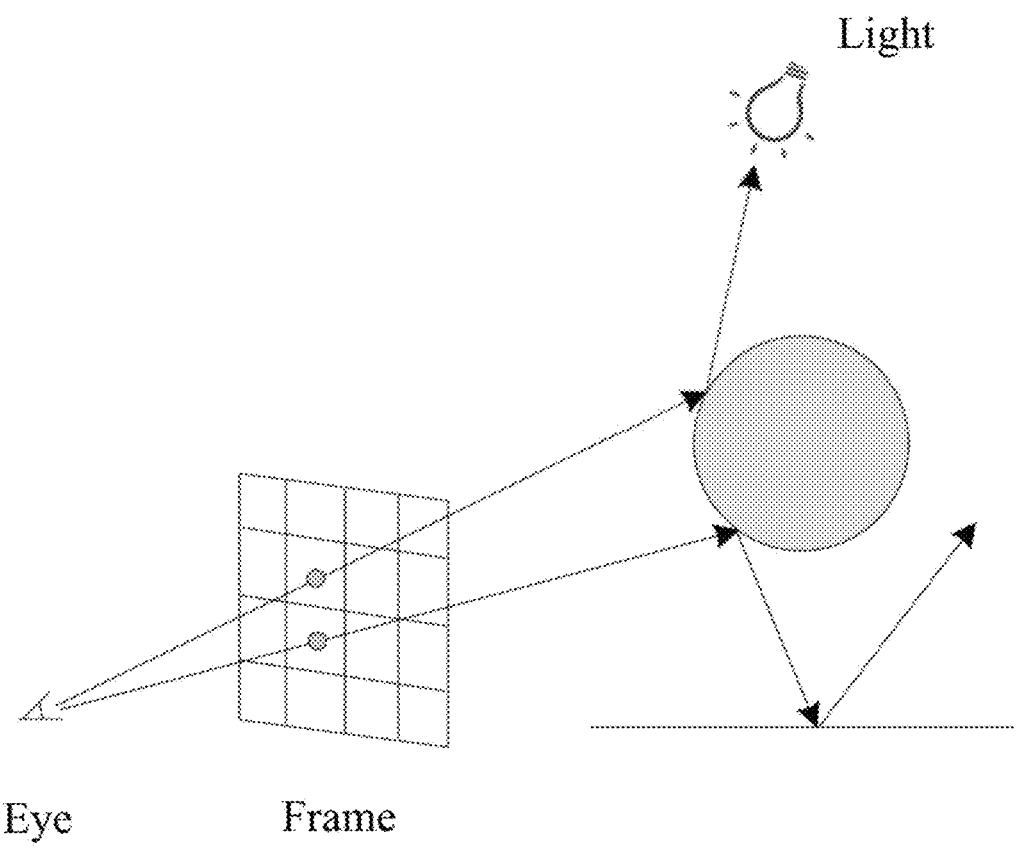
FIG. 2 is a schematic diagram of ray traced.

The rendering effect of ray traced is relatively good, but the calculation amount is relatively large. Furthermore, the ray traced effect is related to the traced times, as shown in FIG. 2, that is, related to the calculation of the reflection and refraction times. To balance the rendering effect and the rendering speed, according to the present invention, the traced times are determined according to the ratio of the average frame rate to the second threshold, and then the three-dimensional model is rendered based on the traced times and by the ray traced. The determining the maximum reflection and refraction times based on the ratio and the number of the model primitives is specifically as follows:

performing calculation according to a formula $$N = \begin{cases} 1, \Gamma \le 0 \\ \lceil \Gamma \rceil, \Gamma > 0 \end{cases}$$

to obtain the maximum reflection and refraction times N, where $\Gamma$ is a parameter, the calculation mode of $\Gamma$ is $$\Gamma = \gamma + 1 - 3\tanh\left(\frac{M}{a}\right),$$

$\gamma$ represents the ratio, M represents the number of the model primitives, $\alpha$ represents a preset value, tanh( ) is a hyperbolic tangent function, and $\lceil \; \rceil$ represents rounding up to an integer.

Assuming that the average frame rate FPS1=80 and the second threshold is 60, $\gamma$=4/3 is obtained through calculation.

In a case that M=500 and $\alpha$=400, $\Gamma$=1.79 and N=2; and in a case that M=1000 and $\alpha$=400, $\Gamma$=1.37 and N=1.

In one specific embodiment, all the primitives in the three-dimensional model are rendered according to the maximum traced times N obtained through calculation and by the ray traced rendering mode.

Figure 3:
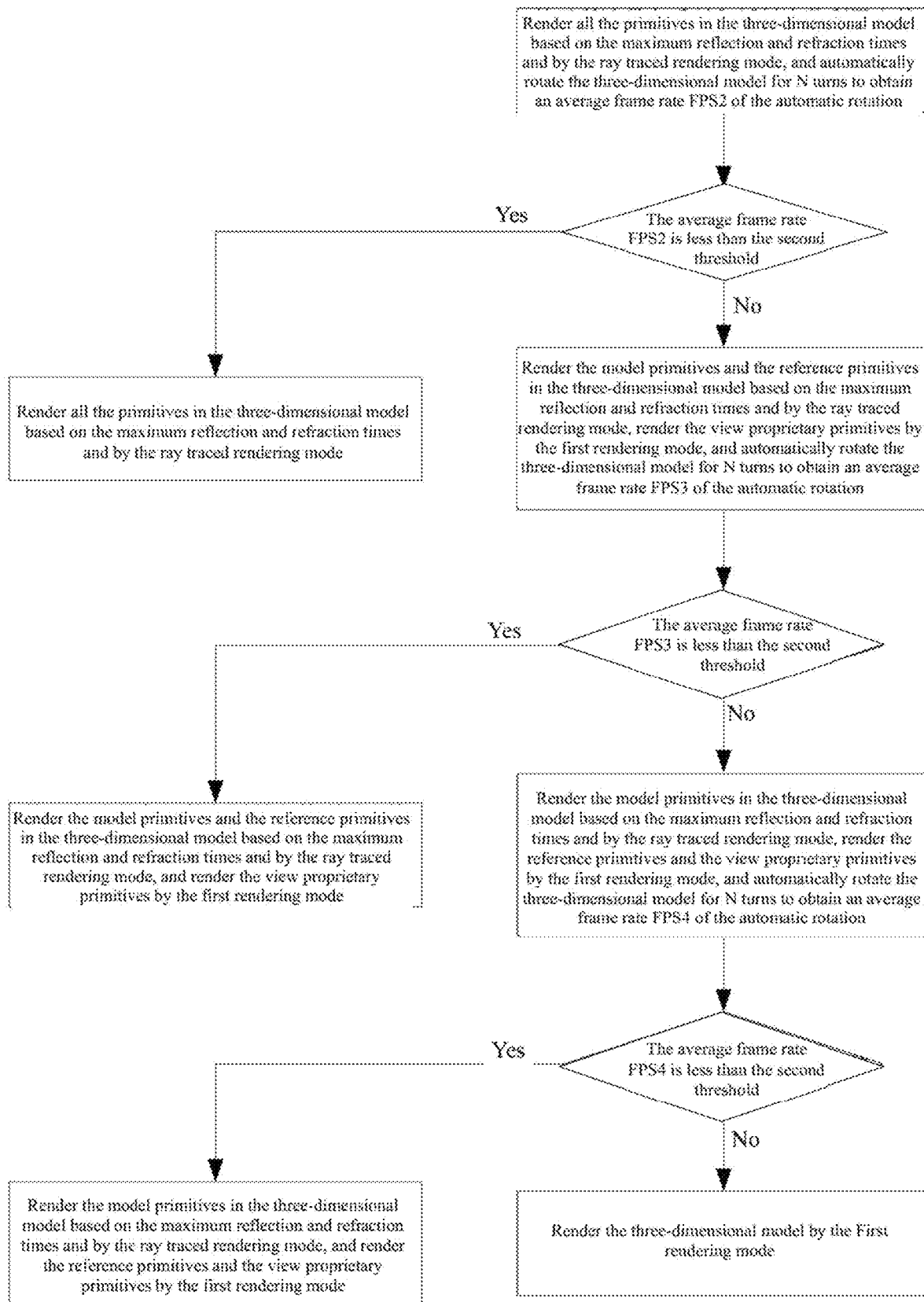
FIG. 3 is a flowchart of ray traced rendering.

However, since the ray traced is a resource-consuming rendering mode, in another embodiment, the rendering the three-dimensional model based on the maximum reflection and refraction times and by a ray traced rendering mode, as shown in FIG. 3, is specifically as follows:

rendering all the primitives in the three-dimensional model based on the maximum reflection and refraction times and by the ray traced rendering mode, and automatically rotating the thre-dimensional model for N turns to obtain an average frame rate FPS2 of the automatic rotation;

in a case that the average frame rate FPS2 is not less than the second threshold, rendering all the primitives in the three-dimensional model based on the maximum reflection and refraction times and by the ray traced rendering mode; otherwise, rendering model primitives and reference primitives in the three-dimensional model based on the maximum reflection and refraction times and by the ray traced rendering mode, rendering view proprietary primitives by the first rendering mode, and automatically rotating the three-dimensional model for N turns to obtain an average frame rate FPS3 of the automatic rotation;

in a case that the average frame rate FPS3 is not less than the second threshold, rendering the model primitive and the reference primitive in the three-dimensional model based on the maximum reflection and refraction times and by the ray traced rendering mode, and rendering the view proprietary primitive by the first rendering mode; otherwise, rendering the model primitive in three-dimensional model based on the maximum reflection and refraction times and by the ray traced rendering mode, rendering the reference primitive and the view proprietary primitive by the first rendering mode, and automatically rotating the three-dimensional model for N turns to obtain an average frame rate FPS4 of the automatic rotation; and in a case that the average frame rate FPS4 is not less than the second threshold, rendering the model primitives in the three-dimensional model based on the maximum reflection and refraction times and by the ray traced rendering mode; otherwise, rendering the reference primitives and the view proprietary primitives by the first rendering mode; otherwise, rendering the three-dimensional model by the first rendering mode.

In this embodiment, the rendering mode which is best matched with the performance of the current computer is determined through gradually trying, and the primitives are rendered by the ray traced mode as much as possible under the condition of meeting the rendering speed.

In another specific embodiment, the rendering the three-dimensional model based on the maximum reflection and refraction times and by a ray traced rendering mode is specifically as follows:

rendering all the primitives in the three-dimensional model based on the maximum reflection and refraction times and by the ray traced rendering mode, and automatically rotating the three-dimensional model for N turns to obtain the average frame rate FPS5 of the automatic rotation; in a case that the average frame rate FPS5 is not less than the second threshold, rendering all the primitives in the three-dimensional model based on the maximum reflection and refraction times and by the ray traced rendering mode; otherwise, taking the maximum reflection and refraction times minus one as the new maximum reflection and refraction times, performing the above process repeatedly until the obtained average frame rate of the automatic rotation is not less than the second threshold. Further, in a case that the maximum reflection and refraction times is 0 finally, the three-dimensional model is rendered by the first rendering mode.

In another specific embodiment, the time complexity and/or the space complexity of the first rendering mode are/is greater than the time complexity and/or the space complexity of the second rendering mode, and the time complexity and/or the space complexity of the first rendering mode and the time complexity and/or the space complexity of the second rendering mode are less than the time complexity of the ray traced rendering mode. In a specific embodiment, the first rendering mode is a ray casting rendering mode, and the second rendering mode is a rasterization rendering mode.

That is, in this specific embodiment, the first rendering mode adopts the casting rendering mode, and the second rendering mode adopts the rasterization rendering mode. It should be understood that the first rendering mode is not limited to the ray casting rendering mode, and the second rendering mode is not limited to the rasterization rendering mode, as long as the time complexity of the second rendering mode is less than that of the first rendering mode and the time complexity of the first rendering mode is less than that of the ray traced rendering mode.

Specific Embodiment 2

Figure 4:
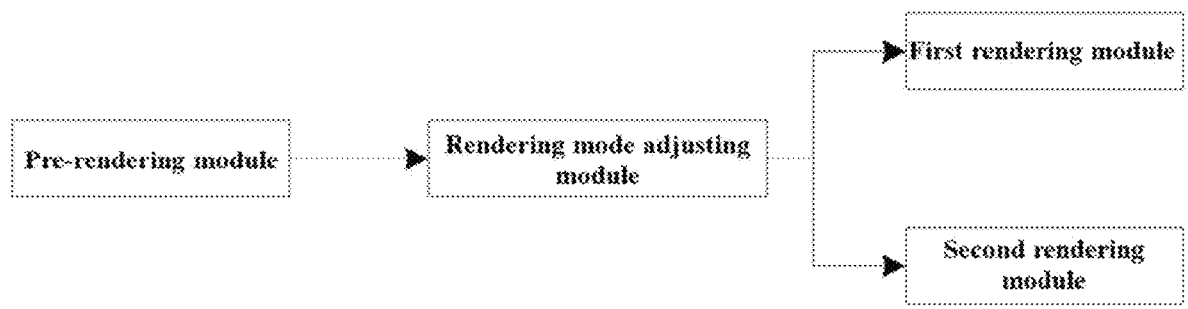
FIG. 4 is a structural diagram of a module according to Specific Embodiment 2.

The present invention provides a three-dimensional view-based fabricated building display system. As shown in FIG. 4, the system includes the following modules:

a pre-rendering module, configured to: load a three-dimensional model of a fabricated building, render the three-dimensional model by a first rendering mode after loading the three-dimensional model, and automatically rotate the three-dimensional model for N turns to obtain an average frame rate FPS1 of the automatic rotation, where N is a positive integer;

a rendering mode adjusting module, configured to: in a case that the average frame rate FPS1 is less than a first threshold, perform a first rendering module; in a case that the average frame rate FPS1 is greater than a second threshold, perform a second rendering module; and in a case that the average frame rate FPS1 is not less than the first threshold and not greater than the second threshold, rendering the three-dimensional model by the first rendering mode, where the first threshold is less than the second threshold;

the first rendering module, configured to: divide the three-dimensional model into two layers, render the first layer by the first rendering mode, and render the second layer by a second rendering mode, where the first layer is a model primitive layer, and the second layer is a reference primitive and view proprietary primitive layer; and the second rendering module, configured to: render the three-dimensional model used by a third rendering mode.

Preferably, the render the three-dimensional model by a third rendering mode is specifically as follows:

obtain the average frame rate FPS1, calculate a ratio of the average frame rate FPS1 to the second threshold, determine the maximum reflection and refraction times based on the ratio and the number of model primitives, and take the maximum reflection and refraction times as a termination condition of ray traced iteration; and render the three-dimensional model based on the maximum reflection and refraction times and by a ray traced rendering mode.

Preferably, the determine the maximum reflection and refraction times based on the ratio and the number of model primitives is specifically as follows:

perform calculation according to a formula $$N = \begin{cases} 1, \Gamma \leq 0 \\ \lceil \Gamma \rceil, \Gamma > 0 \end{cases}$$

to obtain the maximum reflection and refraction times N, where $\Gamma$ is a parameter, the calculation mode of $\Gamma$ is $$\Gamma = \gamma + 1 - 3\tanh\left(\frac{M}{a}\right),$$

γ represents the ratio, M represents the number of the model primitives, α represents a preset value, tanh( ) is a hyperbolic tangent function, and ⌈ ⌉ represents rounding up to an integer.

Preferably, the render the three-dimensional model based on the maximum reflection and refraction times and by a ray traced rendering mode is specifically as follows:

render all the primitives in the three-dimensional model based on the maximum reflection and refraction times and by the ray traced rendering mode, and automatically rotate the three-dimensional model for N turns to obtain an average frame rate FPS2 of the automatic rotation;

in a case that the average frame rate FPS2 is not less than the second threshold, render all the primitives in the three-dimensional model based on the maximum reflection and refraction times and by the ray traced rendering mode: otherwise, render model primitives and reference primitives in the three-dimensional model based on the maximum reflection and refraction times and by the ray traced rendering mode, render view proprietary primitives by the first rendering mode, and automatically rotate the three-dimensional model for N turns to obtain an average frame rate FPS3 of the automatic rotation;

in a case that the average frame rate FPS3 is not less than the second threshold, render the model primitive and the reference primitive in the three-dimensional model based on the maximum reflection and refraction times and by the ray traced rendering mode, and render the view proprietary primitive by the first rendering mode; otherwise, render the model primitive in three-dimensional model based on the maximum reflection and refraction times and by the ray traced rendering mode, render the reference primitive and the view proprietary primitive by the first rendering mode, and automatically rotate the three-dimensional model for N turns to obtain an average frame rate FPS4 of the automatic rotation; and in a case that the average frame rate FPS4 is not less than the second threshold, render the model primitives in the three-dimensional model based on the maximum reflection and refraction times and by the ray traced rendering mode: otherwise, render the reference primitives and the view proprietary primitives by the first rendering mode; otherwise, rendering the three-dimensional model by the first rendering mode.

Preferably, the time complexity and/or the space complexity of the first rendering mode arc/is greater than the time complexity and/or the space complexity of the second rendering mode, and the time complexity and/or the space complexity of the first rendering mode and the time complexity and/or the space complexity of the second rendering mode are less than the time complexity of the ray traced rendering mode.

Specific Embodiment 3

The present invention further provides a computer-readable storage medium. The computer-readable storage medium stores a computer program. When the computer program is run by a processor, the method according to Embodiment 1 is implemented.

Specific Embodiment 4

The present invention further provides a computer device. The computer device at least includes at least one processor and at least one readable memory. The readable memory stores a computer program. When the computer program is executed by the at least one processor, the method according to Embodiment 1 is implemented.

Through the description of the above embodiments, those skilled in the art can clearly understand that the embodiments can be implemented by means of a necessary universal hardware platform, or certainly, can be implemented in a hardware and software combined manner. Based on this understanding, the above technical solution essentially or the part contributed to the prior art may be embodied in the form of computer products. The present invention may use a form of a computer program product that is implemented on one or more computer-usable storage media (including but not limited to a disk memory, CD-ROM, an optical memory, and the like) that include computer-usable program code.

Finally, it should be noted that the above embodiments are only used to describe the technical solutions of the present invention, but not to limit them. Although the present invention is described in detail with reference to the above embodiments, those of ordinary skill in the art should understand; the technical solutions recorded in the above embodiments still can be modified, or part of the technical features can be replaced equivalently; however, those modifications or replacements do not make the essence of the corresponding technical solutions depart from the spirit and the scope of the technical solutions of each embodiment of the present invention.

What is claimed is:

1. A three-dimensional view-based fabricated building display method, comprising the following steps:

S1: loading a three-dimensional model of a fabricated building, rendering the three-dimensional model by a first rendering mode after loading the three-dimensional model, and automatically rotating the three-dimensional model for N turns to obtain an average frame rate FPS1 of the automatic rotation, wherein N is a positive integer;

S2: in a case that the average frame rate FPS1 is less than a first threshold, performing S3; in a case that the average frame rate FPS1 is greater than a second threshold, performing S4; and in a case that the average frame rate FPS1 is not less than the first threshold and not greater than the second threshold, rendering the three-dimensional model by the first rendering mode, where the first threshold is less than the second threshold;

S3: dividing the three-dimensional model into two layers, rendering the first layer by the first rendering mode, and rendering the second layer by a second rendering mode, wherein the first layer is a model primitive layer, and the second layer is a reference primitive and view proprietary primitive layer; and S4: rendering the three-dimensional model by a third rendering mode, wherein the rendering the three-dimensional model by a third rendering mode is specifically as follows:

obtaining the average frame rate FPS1, calculating a ratio of the average frame rate FPS1 to the second threshold, determining the maximum reflection and refraction times based on the ratio and the number of model primitives, and taking the maximum reflection and refraction times as a termination condition of ray traced iteration; and rendering the three-dimensional model based on the maximum reflection and refraction times and by a ray traced rendering mode, wherein the rendering the three-dimensional model based on the maximum reflection and refraction times and by a ray traced rendering mode is specifically as follows:

rendering all the primitives in the three-dimensional model based on the maximum reflection and refraction times and by the ray traced rendering mode, and automatically rotating the three-dimensional model for N turns to obtain an average frame rate FPS2 of the automatic rotation;

in a case that the average frame rate FPS2 is not less than the second threshold, rendering all the primitives in the three-dimensional model based on the maximum reflection and refraction times and by the ray traced rendering mode; otherwise, rendering model primitives and reference primitives in the three-dimensional model based on the maximum reflection and refraction times and by the ray traced rendering mode, rendering view proprietary primitives by the first rendering mode, and automatically rotating the three-dimensional model for N turns to obtain an average frame rate FPS3 of the automatic rotation;

in a case that the average frame rate FPS3 is not less than the second threshold, rendering the model primitives and the reference primitives in the three-dimensional model based on the maximum reflection and refraction times and by the ray traced rendering mode, and rendering the view proprietary primitives by the first rendering mode; otherwise, rendering the model primitives in three-dimensional model based on the maximum reflection and refraction times and by the ray traced rendering mode, rendering the reference primitives and the view proprietary primitives by the first rendering mode, and automatically rotating the three-dimensional model for N turns to obtain an average frame rate FPS4 of the automatic rotation; and in a case that the average frame rate FPS4 is not less than the second threshold, rendering the model primitives in the three-dimensional model based on the maximum reflection and refraction times and by the ray traced rendering mode; otherwise, rendering the reference primitives and the view proprietary primitives by the first rendering mode; otherwise, rendering the three-dimensional model by the first rendering mode.

2. The method according to claim 1, wherein the determining the maximum reflection and refraction times based on the ratio and the number of model primitives is specifically as follows:

performing calculation according to a formula $$N = \begin{cases} 1, & \Gamma \leq 0 \\ \lceil \Gamma \rceil, & \Gamma > 0 \end{cases}$$

to obtain the maximum reflection and refraction times N, $\Gamma$ being a parameter, the calculation mode of $\Gamma$ being $$\Gamma = \gamma + 1 - 3\tanh\left(\frac{M}{a}\right),$$

$\gamma$ representing the ratio, M representing the number of the model primitives, $\alpha$ representing a preset value, tanh( ) being a hyperbolic tangent function, and $\lceil \ \rceil$ representing rounding up to an integer.

3. The method according to claim 1, wherein the time complexity and/or the space complexity of the first rendering mode are/is greater than the time complexity and/or the space complexity of the second rendering mode, and the time complexity and/or the space complexity of the first rendering mode and the time complexity and/or the space complexity of the second rendering mode are less than the time complexity of the ray traced rendering mode.

4. A three-dimensional view-based fabricated building display system, comprising the following modules:

a pre-rendering module, configured to: load a three-dimensional model of a fabricated building, render the three-dimensional model by a first rendering mode after loading the three-dimensional model, and automatically rotate the three-dimensional model for N turns to obtain an average frame rate FPS1 of the automatic rotation, wherein N is a positive integer;

a rendering mode adjusting module, configured to: in a case that the average frame rate FPS1 is less than a first threshold, perform a first rendering module; in a case that the average frame rate FPS1 is greater than a second threshold, perform a second rendering module; and in a case that the average frame rate FPS1 is not less than the first threshold and not greater than the second threshold, rendering the three-dimensional model by the first rendering mode, wherein the first threshold is less than the second threshold;

the first rendering module, configured to: divide the three-dimensional model into two layers, render the first layer by the first rendering mode, and render the second layer by a second rendering mode, wherein the first layer is a model primitive layer, and the second layer is a reference primitive and view proprietary primitive layer; and the second rendering module, configured to: render the three-dimensional model used by a third rendering mode, wherein the render the three-dimensional model by a third rendering mode is specifically as follows:

obtain the average frame rate FPS1, calculate a ratio of the average frame rate FPS1 to the second threshold, determine the maximum reflection and refraction times based on the ratio and the number of model primitives, and take the maximum reflection and refraction times as a termination condition of ray traced iteration; and render the three-dimensional model based on the maximum reflection and refraction times and by a ray traced rendering mode, wherein the render the three-dimensional model based on the maximum reflection and refraction times and by a ray traced rendering mode is specifically as follows:

render all the primitives in the three-dimensional model based on the maximum reflection and refraction times and by the ray traced rendering mode, and automatically rotate the three-dimensional model for N turns to obtain an average frame rate FPS2 of the automatic rotation;

in a case that the average frame rate FPS2 is not less than the second threshold, render all the primitives in the three-dimensional model based on the maximum reflection and refraction times and by the ray traced rendering mode; otherwise, render model primitives and reference primitives in the three-dimensional model based on the maximum reflection and refraction times and by the ray traced rendering mode, render view proprietary primitives by the first rendering mode, and automatically rotate the three-dimensional model for N turns to obtain an average frame rate FPS3 of the automatic rotation;

in a case that the average frame rate FPS3 is not less than the second threshold, render the model primitive and the reference primitive in the three-dimensional model based on the maximum reflection and refraction times and by the ray traced rendering mode, and render the view proprietary primitive by the first rendering mode; otherwise, render the model primitive in three-dimensional model based on the maximum reflection and refraction times and by the ray traced rendering mode, render the reference primitive and the view proprietary primitive by the first rendering mode, and automatically rotate the three-dimensional model for N turns to obtain an average frame rate FPS4 of the automatic rotation; and in a case that the average frame rate FPS4 is not less than the second threshold, render the model primitive in the three-dimensional model based on the maximum reflection and refraction times and by the ray traced rendering mode; otherwise, render the reference primitive and the view proprietary primitive by the first rendering mode; otherwise, render the three-dimensional model by the first rendering mode.

5. The system according to claim 4, wherein the determine the maximum reflection and refraction times based on the ratio and the number of model primitives is specifically as follows:

perform calculation according to a formula $$N = \begin{cases} 1, \Gamma \le 0 \\ \lceil \Gamma \rceil, \Gamma > 0 \end{cases}$$

to obtain the maximum reflection and refraction times N, $\Gamma$ being a parameter, the calculation mode of $\Gamma$ being $$\Gamma = \gamma + 1 - 3\tanh\left(\frac{M}{a}\right),$$

$\gamma$ representing the ratio, M representing the number of the model primitives, $\alpha$ representing a preset value, tanh( ) being a hyperbolic tangent function, and $\lceil \ \rceil$ representing rounding up to an integer.

6. A non-transitory computer-readable storage medium, storing a computer program, wherein when the computer program is run by a processor, the method according to claim 1 is implemented.

* * * * *